United States Patent
Engel et al.

(10) Patent No.: US 9,982,201 B2
(45) Date of Patent: May 29, 2018

(54) REMOVAL OF HYDROCARBON CONTAMINANTS

(71) Applicant: NexoSolutions LLC, The Woodlands, TX (US)

(72) Inventors: David Birenbaum Engel, The Woodlands, TX (US); Scott Nelson Williams, The Woodlands, TX (US)

(73) Assignee: NexoSolutions LLC, The Woodlands, TX (US)

( * ) Notice: Subject to any disclaimer, the term of this patent is extended or adjusted under 35 U.S.C. 154(b) by 303 days.

(21) Appl. No.: 14/557,684

(22) Filed: Dec. 2, 2014

(65) Prior Publication Data

US 2015/0152341 A1 Jun. 4, 2015

Related U.S. Application Data

(60) Provisional application No. 61/910,682, filed on Dec. 2, 2013.

(51) Int. Cl.

| | |
|---|---|
| *C10G 53/12* | (2006.01) |
| *B01D 53/54* | (2006.01) |
| *B01D 53/62* | (2006.01) |
| *B01D 53/78* | (2006.01) |
| *B01D 53/79* | (2006.01) |
| *C10G 31/08* | (2006.01) |
| *C10L 3/12* | (2006.01) |
| *C10G 29/22* | (2006.01) |
| *B01D 53/48* | (2006.01) |
| *B01D 53/75* | (2006.01) |
| *C10L 3/10* | (2006.01) |

(52) U.S. Cl.
CPC ........... *C10G 53/12* (2013.01); *B01D 53/485* (2013.01); *B01D 53/54* (2013.01); *B01D 53/62* (2013.01); *B01D 53/75* (2013.01); *B01D 53/78* (2013.01); *B01D 53/79* (2013.01); *C10G 29/22* (2013.01); *C10G 31/08* (2013.01); *C10L 3/101* (2013.01); *C10L 3/103* (2013.01); *C10L 3/12* (2013.01); *B01D 2251/10* (2013.01); *B01D 2251/21* (2013.01); *B01D 2256/24* (2013.01); *B01D 2257/306* (2013.01); *B01D 2257/308* (2013.01); *B01D 2257/40* (2013.01); *B01D 2257/504* (2013.01); *C10G 2300/202* (2013.01); *C10L 2290/141* (2013.01); *C10L 2290/146* (2013.01); *C10L 2290/24* (2013.01); *C10L 2290/541* (2013.01); *C10L 2290/544* (2013.01); *C10L 2290/547* (2013.01); *Y02C 10/04* (2013.01)

(58) Field of Classification Search
None
See application file for complete search history.

(56) References Cited

U.S. PATENT DOCUMENTS

| | | | |
|---|---|---|---|
| 2,521,940 A | * | 9/1950 | Oriolo ...................... B01J 27/06 585/532 |
| 4,406,867 A | | 9/1983 | Marcinkowsky |
| 5,446,231 A | | 8/1995 | Arganbright |
| 8,048,175 B2 | | 1/2011 | Yang |

(Continued)

*Primary Examiner* — Tam M Nguyen
(74) *Attorney, Agent, or Firm* — Kearney, McWilliams & Davis, PLLC; William C. Yarbrough

(57) ABSTRACT

A system for removing contaminants from both liquid and gaseous hydrocarbon streams and methods thereof are described. An additive that reacts with said contaminant to form water-soluble compounds is injected into the hydrocarbon streams.

3 Claims, 6 Drawing Sheets

(56) References Cited

U.S. PATENT DOCUMENTS

2007/0255081 A1* 11/2007 Beadle ..................... C07C 2/12
                                                  585/509
2012/0103872 A1    5/2012 Li

* cited by examiner

REMOVAL OF HYDROCARBON CONTAMINANTS

PRIOR RELATED APPLICATIONS

This invention claims priority to U.S. 61/865,076, filed on Aug. 12, 2013, and U.S. 61/910,682, filed on Dec. 2, 2013. Both applications are incorporated by reference in their entirety herein.

FEDERALLY SPONSORED RESEARCH STATEMENT

Not applicable.

REFERENCE TO MICROFICHE APPENDIX

Not applicable.

FIELD OF THE DISCLOSURE

The disclosure generally relates to methods of removing contaminants from hydrocarbon steams.

BACKGROUND OF THE DISCLOSURE

Mercaptans, or thiols, are sulfur analogs of alcohols. Though similar in molecular structure, the presence of sulfur instead of oxygen elicits many differences. Mercaptans are more odorous, with a stronger and repulsive smell in mercaptans with lower molecular weights. Mercaptans are responsible for a number of wine faults caused by unintended reactions between sulfur and yeast and for the "skunky" odor of beer after it has been exposed to light. Mercaptans are often used as odorants to assist in the detection of natural gas (which is odorless in its pure form).

In addition to differences in organoleptic properties, sulfur is less electronegative than oxygen, thus mercaptans experience weaker intermolecular forces and hydrogen bonding leading to lower boiling points, lower solubility in water or other polar solvents, and higher equilibrium vapor pressure. Mercaptans are also more acidic when compared to their alcohol analogs because sulfur has a softer, more polarizable electron cloud and is capable of distributing the anionic charge deprotonation.

Hydrocarbon fluids, such as crude oil, crude oil emulsions, oilfield condensate, liquefied petroleum gas, natural gas and residual gases and even refined fuels often contain a variety of mercaptans, including thiols of relatively low molecular weight. In the drilling, production, transport, storage, and processing of hydrocarbon stocks, the mercaptans encountered can cause many problems ranging from malodors to metal corrosion. Hydrogen sulfide, carbonyl sulfide and mercaptans are all detrimental sulfur species to hydrocarbon streams when these hydrocarbon streams are being processed.

In liquid hydrocarbon streams, these contaminants, among others, are often found in natural gas liquids, gasoline, diesel fuel, and kerosene. When the liquid hydrocarbon streams are burned, the contaminants can reduce efficiency of catalytic converters and generate corrosion. In gaseous streams, these contaminants are often found in natural gas, process off gas, flash gas, residual gas, biogas, process vapors from storage tanks, transport lines or vessels and associated gas in petroleum production operations. As with liquid streams, when the gas streams are combusted or flared, the contaminants can generate new detrimental sulfur species that can be released into the environment. From both a health/safety and process efficiency perspective, the removal of mercaptans is extremely necessary.

Many methods for removing mercaptans exist. Various additives have been employed for the removal of sulfur compounds from hydrocarbon streams ("sweetening" process). Conventional methods in the prior art for removing mercaptans from hydrocarbons typically involve "sweetening," wherein mercaptans are oxidized to form disulfides. Light mercaptans ($C_1$-$C_4$) may be removed in an aqueous wash in this process but removal of heavy mercaptans ($C_{4+}$) is less effective due to the poor water solubility of heavy mercaptans.

U.S. Pat. No. 8,048,175 discloses the use of a mercaptan scavengers having di-substituted azodicarboxylates to remove contaminants from hydrocarbons, including naphthas and gasolines. Oxidation by a strong oxidant reagent such as sodium hypochlorite (US 20120103872) or hydrogen peroxide has been employed. Other methods for mercaptan removal from hydrocarbon streams are also available including oxidation using ozone, biological removal processes, catalytic decomposition and adsorption into solid beds (i.e. functionalized activated carbon), and specialized solvents. Only the two latter methods however are commonly used in the industry.

The most common method utilized today is the reaction with caustic (sodium hydroxide) compounds to form mercaptanate (or thiolate) salts. The reaction with caustic is effective, and sodium hydroxide is readily available at low costs. The caustic treatment however produces a waste stream commonly known as spent caustic that has to be treated or managed properly. The use of caustic for mercaptans removal causes high salt content, and in many cases, there is odor release. The spent caustic can be regenerated by using a catalytic process and oxygen. A regeneration process is shown in FIG. 1. This reaction regenerates the caustic that is re-used in the process; however, it also produces secondary disulfide by-products (also called Red Oil), which are water immiscible materials that can be a challenge for disposal.

For the hydrocarbon producers, transporters, refiners and users, complying with such increasingly stringent specifications has primarily meant using more stringent safety and processing conditions. Amine treating, stripping and scavenging are potential methods for removing these sulfur-containing contaminants online; however, many negative aspects associated with these methods in terms of cost, efficacy and safety render these processes inefficient.

As such, there is a need for improved methods of removing contaminants, especially sulfur-containing contaminants, from both liquid and gas hydrocarbon streams. Preferably, these methods are cost effective, have a small environmental footprint and remove the contaminants, including larger (>C4) mercaptans, without release into the environment.

SUMMARY OF THE DISCLOSURE

A novel system for reacting, extracting and removing contaminants from hydrocarbon streams and methods of use are disclosed. Specifically, the contaminants are irreversibly transformed into water-soluble species. The novel system then removes the transformed contaminants by washing the hydrocarbon stream with water downstream from the transformation step, thus eliminating all traces from the hydrocarbon.

Conventional approaches to removing dissolved polar compounds such as contaminants by washing a hydrocarbon steam with water include water-wash towers and water injections followed by coalescers or knock-out drums. In both processes, water is dispersed into the hydrocarbon stream followed by a separation downstream. However, the mixing and separation steps in these processes are not very efficient, resulting in low contamination removal rates. Furthermore, improvements to the extraction efficiency of such approaches often require using larger vessels, larger quantities of water and better pumping systems to handle such water, and larger system foundations, thus making the improvements cost inhibitive.

The novel system presented herein overcomes many of the problems with the conventional techniques, namely increased water contact and mixing to increase efficient mass transfer and a better separator. The novel system is an extractor-separator that is small in size leading to a small environmental footprint and smaller site requirements. The system can also be modular, allowing an operator to only buy the necessary components with the option to increase the system at a later time if necessary. Additionally, the modular design also allows for flexibility in system configuration.

In more detail, the novel system has an upstream injection of additives into the hydrocarbon stream followed by a mixer to transform contaminants in the hydrocarbon stream to water-soluble compounds. This mixture is introduced into a contactor to undergo further mixing and contacting between the additive and hydrocarbon stream to increase contaminant transformation rates. The hydrocarbon and water-soluble contaminant stream is then mixed with a water injection in a second mixer before undergoing extraction in an extractor/separation vessel. The contaminant-containing water is then removed from the treated hydrocarbon stream. Depending on the nature and amount of contaminants present in the extracted water, post-treatment may be necessary e.g. to adjust pH, but is not necessarily required.

Multiple systems can be installed in sequence to removed different contaminants from a single stream. Alternatively, the additive injection can include one or more compounds that transform one or more different contaminants into water-soluble compounds. In other words, the first additive can transform e.g. mercaptans and the second additive can transform e.g. COS into water-soluble compounds.

In another embodiment, preferred streams to be treated in accordance with the present system are distillate boiling range streams. Non-limiting examples of hydrocarbon feed streams boiling in the distillate range include diesel fuels, jet fuels, and heating oils. Such streams typically have a boiling range from about 150° C. to about 400° C. Another type of hydrocarbon stream that is also preferred for being treated in accordance with the present invention are naphtha boiling range streams, which are also referred to as gasoline boiling range streams. Naphtha boiling range streams can comprise any one or more refinery streams boiling in the range from about 10° C. to about 250° C., at atmospheric pressure. The naphtha boiling range stream generally contains cracked naphtha that typically comprises fluid catalytic cracking unit naphtha (FCC catalytic naphtha, or cat cracked naphtha), coker naphtha, hydrocracker naphtha, resid hydrotreater naphtha, debutanized natural gasoline (DNG), and gasoline blending components from other sources from which the naphtha boiling range stream can be produced.

Due to the design of the system, any chemical formulation that converts contaminants into water-soluble compounds or salts can be used as the additive. Ideally, the chemical formulation is in liquid form when injected into the hydrocarbon stream and can either be liquefied on site in a pre-injection preparation step or mixed off site using water as a solvent. In some applications, no contaminant transformation is necessary and the additive is water alone. In other applications, the additive can be heated to form a gaseous stream for mixing with a gaseous hydrocarbon stream.

The novel system also utilizes two separate mixers. Any mixer can be used, including both static and valve designs; however, static mixers are preferred in some embodiments. The static mixers can use coil or helical elements, plates, baffles or geometric grids positioned at precise angles to direct flow and increase turbulence. The cross-section shape can vary, but typically, round, square, or rectangular shapes are used. The advantage of the static mixers in the present system over dynamic mixers, other than the fact that static mixers have no moving parts, is that static mixers split the stream hundreds, or even thousands of times, thus resulting in a continuous phase containing very fine droplets of discontinuous phase. This results in a much larger surface area when compared with dynamic mixers. Another advantage of static mixers over dynamic mixers is that they can provide substantially high mixing energies while maintaining a relatively narrow distribution of droplet size, which is more desirable than a wider distribution of droplet size, which happens during dynamic mixing. The same type or different mixers can be used in the system.

The specifications of the mixer depend on the stream to be treated and expected flow rates. For instance, multiple mixers may be necessary if there are two liquid injections that require immediate mixing after injection for increased contact time. As the system is modular, the additional mixers can be added as needed to expand the capabilities of the system.

Any source of water including purified water, riverwater, seawater, produced fluids and the like can be used in both the additive injection and water injection. Typically, an optional filter or pre-treating step cleans the water before it is mixed with the hydrocarbon stream. In a preferred embodiment, purified water should be used. In some embodiments, purified water with adjusted pH should be used. The adjustment of the purified water preferably changes the pH of the aqueous stream collected downstream to 5-8, more preferably to 5.5-7.5, and most preferably to 6.5-7.

Any separation device can also be used in the extraction phase, including enhanced-gravity settling, coalescing, centrifugal force, absorbent polymer separation, vacuum separation, and electrical charge. Coalescing separation devices or centrifuges are preferred separators. In a coalescing device, droplets too small to separate via gravity are combined to form larger droplets that can be easily separated out. Exemplary coalescers include fiber media high efficiency coalescers, wire mesh screens, vane elements, and filter cartridges. A microfiber media high efficiency coalescer is most preferred. Centrifuge separators spin the fluid such that the difference in specific gravity between the hydrocarbons and the water is magnified, allowing for removal of free water and some emulsified water.

In addition to the novel extractor-separator design, methods of use are also described. In one embodiment, contaminants are removed from a liquid hydrocarbon streams, the method comprising supplying a liquid hydrocarbon stream; combining and mixing the liquid hydrocarbon stream with at least one additive that targets a particular contaminant and chemically transforms said contaminant into a water-soluble compound, wherein combining the liquid hydrocarbon stream and the additive forms a liquid hydrocarbon and water soluble contaminant mixture; adding and mixing water into the liquid hydrocarbon and water soluble contaminant mixture; and separating or extracting the water and water soluble contaminants from the liquid hydrocarbon and water soluble contaminant mixture resulting in a treated liquid hydrocarbon.

In another embodiment, contaminants are removed from a gaseous hydrocarbon stream where the contaminants are turned into water soluble products by the additive and, the method comprising supplying a gas stream; combining and mixing the gas stream with an additive that targets a particular contaminant and chemically transforms said contaminant into a water-soluble compound wherein combining the gas stream and the additive makes a gas and water soluble contaminant mixture; adding water to the gas and water soluble contaminant mixture; and separating at least one water soluble contaminant from the gas and water soluble contaminant mixture resulting in a treated gas stream.

In yet another embodiment, sulfur-containing contaminants are removed from liquid hydrocarbon streams and washed out of the liquid hydrocarbon stream by water, the method comprising supplying a liquid hydrocarbon stream; combining the liquid hydrocarbon stream with an additive containing a hydroxyl and a polyalcohol wherein combining the liquid hydrocarbon stream and the additive makes a liquid hydrocarbon and water soluble contaminant mixture; adding water to the liquid hydrocarbon water soluble contaminant mixture; and separating or extracting the water soluble contaminants from the liquid hydrocarbon water soluble contaminant mixture resulting in a treated liquid hydrocarbon.

In another embodiment, sulfur-containing contaminants are removed from a gaseous hydrocarbon stream where the contaminants are turned into water soluble products and separated by coalescence or washed out of the gas stream by water, the method comprising supplying a gas stream; combining the gas stream with an additive comprising a hydroxyl and a polyalcohol wherein combining the gas stream and the additive make a gas and water soluble contaminant mixture; adding water to the gas and water soluble contaminant mixture; and separating at least one water soluble contaminant from the gas and water soluble contaminant mixture resulting in a treated gas stream.

In both of the above embodiments for removing sulfur-containing contaminants, the polyalcohol (OC) is a specialized polyhydric alcohol molecule stabilized by hydroxyl materials that enables the removal of $H_2S$, mercaptans, COS and $CO_2$ by transforming them into water-soluble compounds. The general chemical equation for the reaction with mercaptans is:

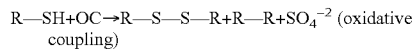
R—SH+OC→R—S—S—R+R—R+$SO_4^{-2}$ (oxidative coupling)

The polyalcohol can be glycerol and alkylene glycols, for example, ethylene glycol, diethylene glycol, triethylene glycol, tetraethylene glycol, propylene glycol, dipropylene glycol, 1,2-butylene glycol, di-1,2-butylene glycol, and the like. However, any number of OH groups can be included in the polyalcohol, including triols, tetraol, pentols, hexyls and the like. Preferred hydroxyl sources include alkali metal hydroxides. U.S. Pat. No. 4,406,867 describes methods of removing contaminants using the polyalcohol/hydroxyl combination.

The concept behind the disclosed system and methods was to use a non-regenerative mercaptans-removal process that will not produce any significant waste. This not only will minimize capital costs but will also reduce any post-treatment costs. The reaction pathway utilized does not involve the use of caustic and eliminates the need for secondary treatments such as regeneration of spent caustic or spent caustic disposal.

The present system and methods are described using mercaptans and other sulfur-containing contaminants as exemplary species, but these are just some of the contaminants that can be converted to water-soluble products. Additionally, water-soluble components present in the hydrocarbon stream can also be removed. Other target compounds include amines (e.g. monoethanolamine, diethanolamine, triethanolamine, N-methylethanolamine, N,N-dimethylethanolamine, morpholine, N-methyl morpholine, ethylenediamine, methoxypropylamine, N-ethyl morpholine, N-methyl ethanolamine, N-methyl diethanolamine, and the like), metals (e.g. calcium, iron, zinc, silicon, nickel, sodium, potassium, vanadium, and the like), chlorides, carbon dioxide, phenols, and aromatic hydrocarbons.

In another embodiment, thioether contaminants are removed from a gas or liquid hydrocarbon stream where the contaminants are turned into water soluble products and separated by coalescence or washed out of the stream by water, the method comprising supplying a hydrocarbon stream; combining the stream with an additive comprising an oxidizing agent wherein combining the stream and the additive make a hydrocarbon and water soluble contaminant mixture; adding water to the hydrocarbon and water soluble contaminant mixture; and separating at least one water soluble contaminant from the hydrocarbon and water soluble contaminant mixture resulting in a treated hydrocarbon stream.

The oxidizing agent can be sodium and calcium hypochlorite, sodium chlorite, chlorine dioxide, hydrogen peroxide, sodium, calcium and zinc peroxide, sodium, potassium and ammonium perborate, potassium permanganate, peroxyacetic acid, tert-butyl peroxide and benzoyl peroxide.

In one embodiment for removing thioether contaminants, the oxidizing agent is a sodium hypochlorite solution that enables the removal of e.g. dimethyl sulfide by transforming it into a water-soluble compound according to the following reaction:

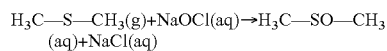
$H_3C$—S—$CH_3$(g)+NaOCl(aq)→$H_3C$—SO—$CH_3$ (aq)+NaCl(aq)

In other embodiments, removal of water-soluble compounds such as salts already present in the hydrocarbon stream is desired, thus negating the need for a special additive. In these situations, the initial additive injection will comprise water or a water/solvent mixture for a simple extraction without chemically transforming the contaminants. The solvent can be organic or aqueous and have any pH level. As mentioned above, various acids have been used to remove mercaptans. U.S. Pat. No. 5,446,231 describes a method of removing nitrile contaminants from a C5 stream using a 50/50 methanol/water extraction.

While it is possible to use almost any solvent combination with the present system, extensive cleanup or disposal methods for the waste stream may be necessary depending on the chosen solvents.

In other embodiments, two or more additives that target different contaminants are combined and injected into the hydrocarbon stream to simultaneously remove multiple contaminants. In other embodiments, multiple systems are set up in sequence to allow for removal of multiple contaminants.

As used herein, "additive" is used to refer to the chemical that is added to the hydrocarbon stream before the water wash stage. In some embodiments, the additive converts the targeted contaminants in the hydrocarbon stream into water-soluble compounds for removal. In other embodiments, the additive changes solution conditions such as pH to encourage mass transfer into water or aqueous phase. In yet other embodiments, the additive is water alone. The specific formulation is contaminant-specific and varies on the application of the described methods.

As used herein, "effective amount of time" refers to the time in which the contaminant-containing hydrocarbon stream is subjected to static mixing conditions with the additive. That is, the amount of time needed to convert a predetermined amount, preferably substantially all, of the contaminants into the corresponding water-soluble compound. This amount of time ranges from 0.1 seconds to 15 minutes.

As used herein, "residence time" refers to the time in which the hydrocarbon stream and water solution is subjected to extraction conditions in the separator. That is, the amount of time needed to separate the water and water-soluble contaminants from the hydrocarbon stream. This amount of time depends on a number of factors including vessel size, flow rates, and the type of separator used.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| PPM WT | Parts per million by weight |
| LPG | Liquid petroleum gas |
| GC | Gas Chromatography |
| GPM | Gallons per minute |
| RO | Reverse osmosis |

DETAILED DESCRIPTION

The disclosure provides a novel system and methods of removing mercaptans (both low and high molecular weights) and other contaminants from hydrocarbon streams, with little to no environmental release. Particularly, the contaminants in the hydrocarbon steam are transformed into water-soluble compounds and removed after contact with a water stream. The system and methods are more cost effective than those commonly used because no post-removal streams need to be treated.

Figure 1:
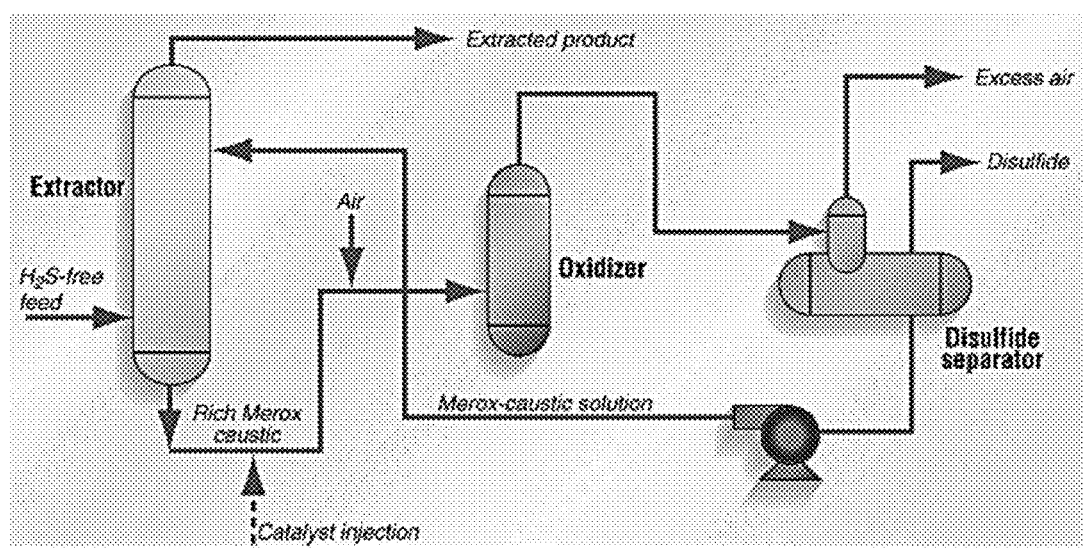
FIG. 1. General mercaptans removal process using caustic additives.
Figure 2:
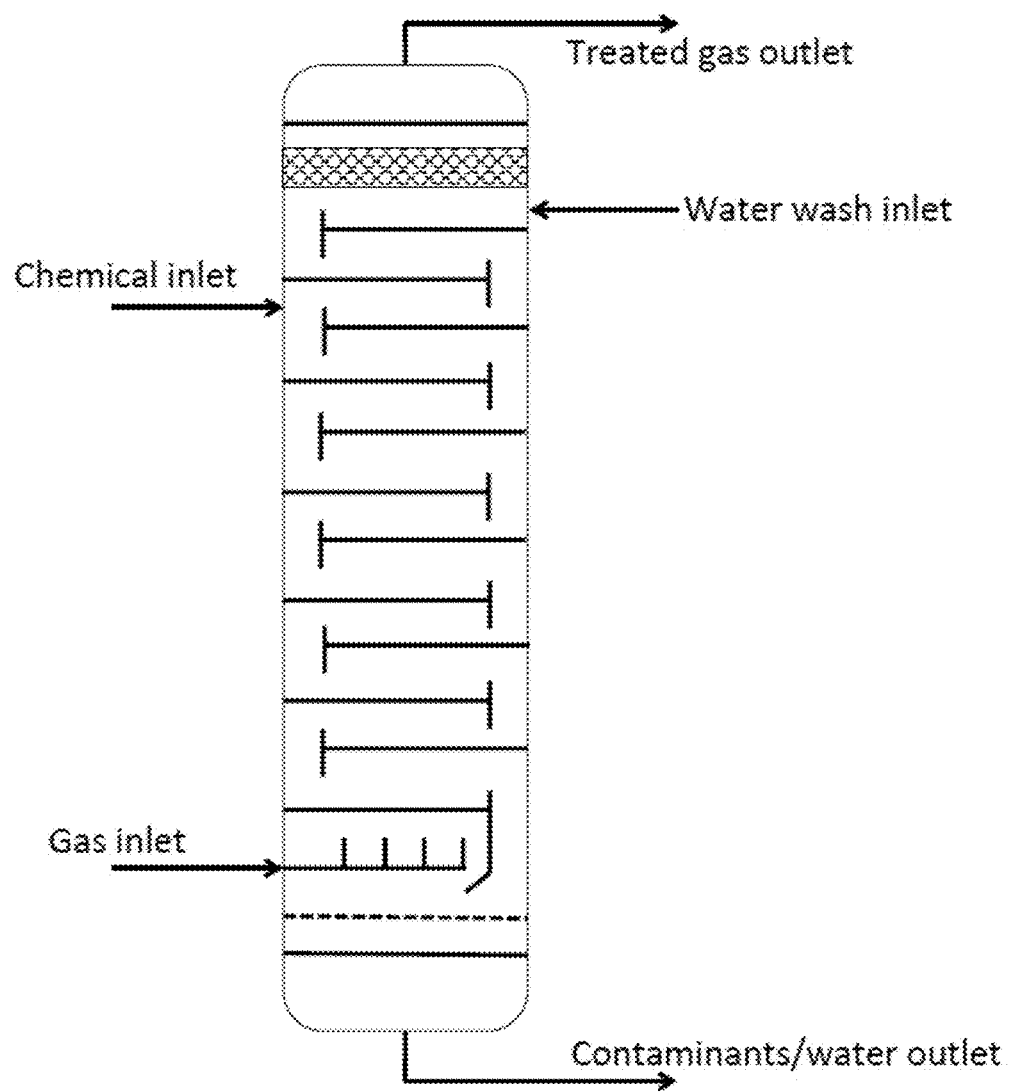
FIG. 2. Schematic of a water wash tower with an incorporated wash tray design.

Conventional methods for removing water-soluble contaminants from hydrocarbon streams include water wash towers or water injections followed by coalescers or knock-out drums. FIG. 2 displays a typical water wash tower having a set of trays above the feed point in the absorber plus a separate tray, or packed water-wash vessel, downstream of the contactor. The hydrocarbon gas is introduced below the trays and the wash water is introduced above the trays. Optionally, a chemical is also introduced to convert contaminants to water-soluble salts, but this step can be performed in the gas line before the absorber, too. As the gas rises, it contacts with the water, allowing water-soluble contaminates to transfer from the gas to the water phase.

During water washing, the hydrocarbon feed rates must be cut by as much as 20-30% for at least several hours during the decontamination. Large quantities of water are run through the tower in a re-circulating loop, with a small fraction of water continually added to the loop, and a small fraction of water continually purged. Thus, large amounts of water need to be supplied, cleaned, and disposed of, adding to the operational cost of the water wash tower.

An additional disadvantage of the conventional systems is the inefficient removal of contaminants. A typical tray, or packed-column, offers 60% stage-wise efficiency for mass-transfer and consequently requires a large wash column for mass transfer. Additionally, multiple stages may need to be applied to overcome the low stage-wise efficiencies. Finally, these systems do not have high aqueous-hydrocarbon separation efficiencies; thereby, increasing the likelihood of the extracted component being re-entrained back into the hydrocarbon.

One way to increase extraction efficiency is to use a very high specific surface area for contact between the two fluid phases, to allow the dissolved contaminants to transfer into the extracting phase (e.g. wash water). Typically, the specific surface area (wetted surface area per unit volume) of a trayed or packed column is such that a single stage offers approximately 60% or lower efficiency of mass transfer, on the basis of an equilibrium stage.

One possible solution is to reduce water droplet size to increase surface area. If water is injected into the stream followed by a static-mixer, the degree of mass transfer efficiency is related to the droplet distribution produced across the static mixer, or spray nozzle. The trade-off typically faced is related to the separation efficiency of the downstream separator. The smaller the droplets generated by the mixing device, the harder the downstream separation becomes. The effect of droplet size on specific surface area, and on residence time needed for separation is illustrated in Table 1.

TABLE 1

Estimated Specific Surface Area and Separation Requirements

| Droplet Size (micron) | Specific Surface Area (m$^2$/m$^3$) | Residence Time For Separation |
|---|---|---|
| 500 | 600 | 3 min |
| 250 | 1200 | 10 min |
| 100 | 3000 | ~1 hour |
| 10 | 30,000 | ~5 days |
| 1 | 300,000 | ~1 year |

System consists of 5% water in a hydrocarbon stream with a specific gravity of 0.4 g/cm$^3$ and a viscosity of 1 cP.

As can be seen in Table 1, the smaller the droplets, the higher the specific surface area. However, since the separation requires exponentially higher residence time, there is a practical limit to this approach using conventional separations. The conventional means of addressing the size limitations of the separation methods is to either increase the number of stages, which means building a taller extraction column, and/or increasing the extract flow rate, which requires larger separation sections. Such changes will increase operational time and cost.

The present application describes a novel extractor-separator system that seeks to address the inherent limitations of conventional separation systems by facilitating a high specific surface area contact between the two phases. The mass transfer occurs on the micro-structured extraction media. This level of contact is then immediately followed by an effective means of capturing the dispersed phase and effectively separating it out of the system by the creation of large droplets. The high specific contact area may be an order of magnitude, or more, larger than that possible in conventional extraction systems, which allows for exceptionally high stage-wise efficiencies.

In addition to improving the contamination removal, the described extractor-separator is more cost efficient. Capital costs are a major factor affecting the decision-making with regard to the installation of any separation technology and are directly related to the size of the pressure vessels required for a particular flow rate. The conventional approaches described above require rather large vessels, a number of re-circulating pumps, large foundations and therefore very high capital costs. The currently described system is specifically intended to allow large flows to be handled in a smaller vessel. Furthermore, the small systems required minimal water, further reducing cost associated with supplying, cleaning and disposing thereof.

The present system and methods of use are exemplified with respect to the examples and figures below. However, this is exemplary only, and the invention can be broadly applied to any hydrocarbon processing units. Furthermore, while mercaptans and amines are targeted contaminants, any contaminant that can be transformed into a water-soluble compound can be targeted. Removal of carbon dioxide, sulfides, and other small molecule contaminants in hydrocarbon streams has also been achieved by the present system. The following examples are intended to be illustrative only, and not unduly limit the scope of the appended claims.

Extractor-Separator System

Figure 3:
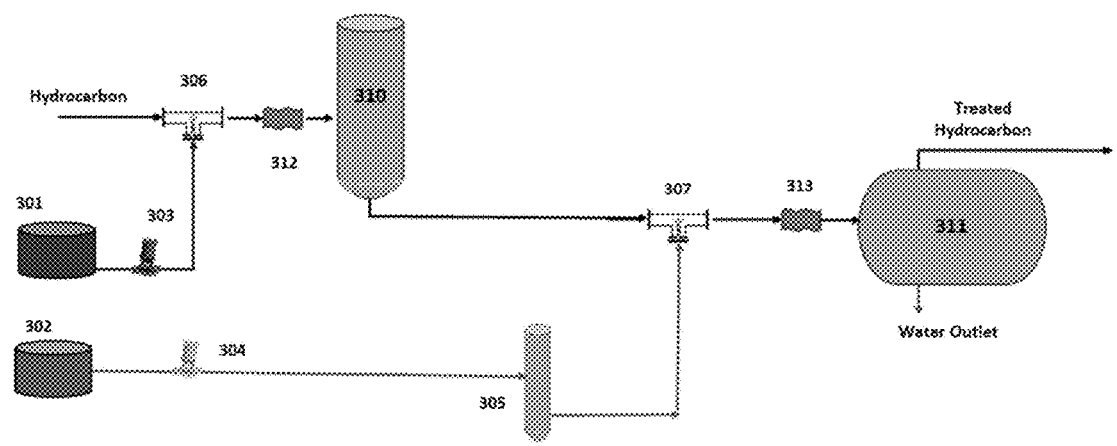
FIG. 3. Schematic of the extractor-separator system according to one embodiment.

A general schematic of the presently disclosed system, which will also be referred to as the extractor-separator system, is shown in FIG. 3. The extractor-separator system utilizes an upstream injection of additives followed by mixing in a mixer and contactor. The contactor aids in additional mixing and contacting of the hydrocarbon stream with the additive. The additive contacts the contaminants in the hydrocarbon stream and transforms the contaminants into water-soluble compound. The effective amount of time needed to mix the additive with the hydrocarbon stream depends on the targeted contaminant and desired amount of transformation. For most contaminants, at least 75% can be transformed into water soluble compounds in 0.1-75 seconds, while some contaminants can require as long as 15 minutes. A high performance water wash stage is installed downstream of the contactor and injects water into the hydrocarbon-additive stream. The hydrocarbon-additive-water solution is then routed through a second mixer to an extraction stage for phase separation and by-product removal. At this point, any additive remaining is still capable of functioning and transforming contaminants that it contacts. The additive, water, and water-soluble compounds are separated from the hydrocarbon stream to form a treated hydrocarbon stream.

The present design is highly effective not only for treating the hydrocarbon stream but also for removing any existing water soluble impurities using the high performance water wash stage downstream of the initial additive and mixing stages. The use of multiple mixing steps (two mixers and contactor) before the extraction overcomes the problem of limited contact efficiency normally seen in conventional approaches to washing or scrubbing. Additional advantages include the small system size and low water requirement, small footprint, and ability to be a customizable modular system if necessary.

In more detail, a gas or liquid hydrocarbon stream is supplied at a constant flow rate to the extractor-separator system. This hydrocarbon stream comprises contaminants that are water soluble or can be converted to water soluble species upon contact with a suitable chemical formulation additive. An additive (301) or water is pumped (303) into the hydrocarbon stream and mixed in a first mixer (312) to form a mixture of the gas or liquid hydrocarbon, the additive, and water soluble contaminants. This mixture is then passed through a contactor vessel (310) which aides in additional mixing and contact between the hydrocarbon stream and additive to transform more contaminants.

Water (302) is pumped (304) through a filter (305) and the filtered water is then injected into the hydrocarbon/additive/contaminant stream using a water injection device (307) followed by mixing of the water and hydrocarbon/additive/contaminant stream in a second mixer (313). This solution is then introduced into an extractor (311) wherein the additive, water soluble contaminants and water are separated or extracted from the hydrocarbon stream using a separation device, such as a coalescer or centrifuge. The treated hydrocarbon is removed from the extractor for further processing and the water/contaminant/additive stream is removed for disposal, further treatment for disposal or re-use, or direct re-use.

Re-use of the removed water/contaminant/additive stream is beneficial in applications with low availability for water, and where incomplete reaction of the chemical additive is occurring. The water/contaminant/additive stream is recirculated to the suction side of the fresh additive injection pump (306) for re-use.

One of the novel features of the present system is the injection point (306) for the additive (301). The injection point (306) is upstream from multiple mixers (312, 313) and a contactor stage (310), which facilitates maximum interaction of the targeted contaminants and the additive. This leads to higher removal efficiencies because more contaminants will be transformed into water-soluble compounds. Thus, when combined with a water wash downstream, a significant increase in contaminant removal is experienced.

Furthermore, the extractor-separator system utilizes small vessels, which allow for minimal water requirements. In some embodiments, water is added at a concentration of 1-5% by volume relative to the gas or liquid hydrocarbon water-soluble contaminant mixture. Preferably, water is added at 1-4% by volume concentration and most preferably at a 2% by volume concentration of the gas or liquid hydrocarbon water-soluble contaminant mixture. This is much less than the 20-40% by volume required for conventional systems such as the water wash tower.

The concentration of the additive depends on the targeted components and their expected concentrations in the hydrocarbon stream. For sulfur-containing species, the additive is added for a final concentration of 0.5-4 moles per mole of sulfur species, preferably 1-2 moles per mole of sulfur species, and most preferably, 1 mole of additive per mole of sulfur species.

In some embodiments, no additive is added as removal of existing water-soluble compounds such as amines, salts, and iron species are desired. In these situations, only water is added to the hydrocarbon stream upstream of the first mixer.

Example 1

The presently described extractor-separator system was used to remove sulfur-containing contaminants from a liquid hydrocarbon stream. The novel system and methods were designed to be flexible and usable with a variety of processing equipment, particularly those already established.

Figure 4:
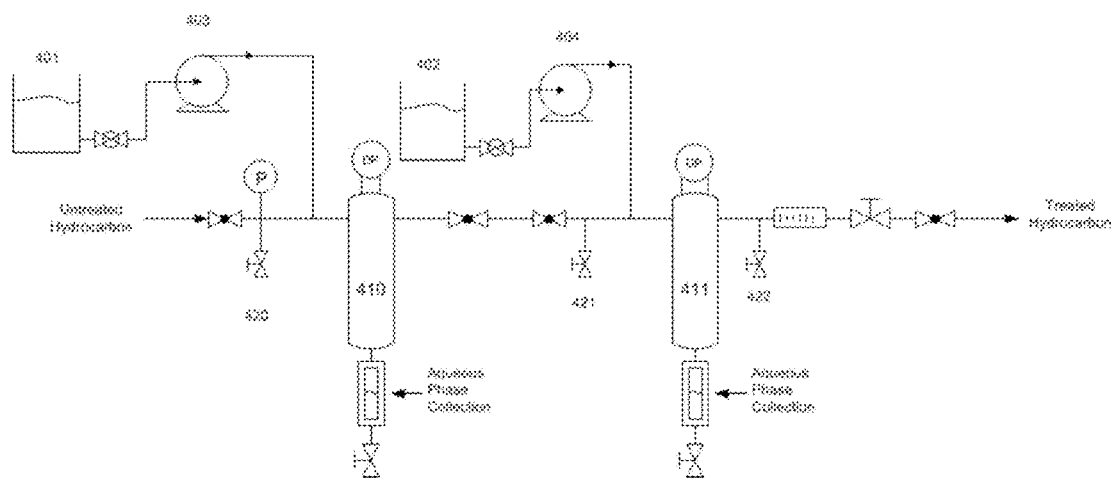
FIG. 4. Schematic of a miniaturized extractor-separator system for field deployment and on-site testing.

In the present example, a miniaturized extractor-separator system was assembled using the same treatment stages as a full size extractor-separator system described above. FIG. 4 shows the schematics of the small scale extractor-separator system, including the high pressure injectors (403, 404) and injection points for the additive (401) and the water (402), in addition to the valve arrangement, the contactor (410) and extractor stages (411) and the effluent streams. Additions to the miniaturized extractor-separator system include sampling points to monitor the process.

A 1.65 GPM slipstream of liquid condensate was processed by the miniaturized extractor-separator system. This on-site test is used to determine if removal using the system with a polyalcohol additive would meet pipeline specifications on total sulfur and mercaptans.

The processing conditions for the miniaturized system were as follows:
- 140° C. condensate temperature (stabilizer outlet)
- 65 mL/min injection rate (chemical/water)—approximately 1% of total flow
- Chemical/water injection at room temperature (21° C.)
- 1.65 GPM condensate flow into miniaturized system
- Chemical injection followed by water injection
- Samples taken using specialized "piston cylinders" for proper sampling integrity
- Sampling and mercaptans analysis performed on-site
- 10 minute run time per data point after chemical was injected
- Local RO water used for water wash injection and solubilizing of additive Chromatographic Analysis:

Condensate samples were captured before and after each stage (420, 421, 422) and analyzed on-site using Gas Chromatography (GC) to measure changes in mercaptan concentration downstream of the chemical injection and downstream of the water injection. The chromatographic conditions are given in Table 2.

TABLE 2

Gas Chromatographic Conditions

| Gas Chromatograph | Column | Detector |
|---|---|---|
| Agilent 6890N | SAS (Sx proprietary column) (Agilent/Sulphur Experts) | Thermal Conductivity |
| Agilent 7890N | PlotQ (Agilent) | Thermal Conductivity |
| Agilent 7890N | GasPro (Agilent) | Flame Photometric |

A calibration curve was constructed for every mercaptan analyzed. The results were initially obtained in parts per million (ppm) on a volume basis and then further converted to ppm weight.

The removal of mercaptans was observed as a function of the additive and water wash concentration. The dosage of additive was adjusted to treat 2000 ppm of total mercaptans. Because the mole ratio of the additive to mercaptans is 1 to ½, the concentration of the additive is approximately two-times the amount of mercaptans in ppm. Thus, mercaptan removal was tested at 0.5, 1.0 and 1.5 mole ratios of the OC in 12, 24 and 38 ml/gallons, respectively. This resulted in 3000, 4500 and 6000 ppms of OC to 2000 ppm of mercaptans.

Table 3 shows the removal of mercaptans at the contactor and extractor outlet for increasing the concentration of the additive.

TABLE 3

Mercaptans removal as a function of additive mole ratio.

| | No additive | 0.5 mole ratio additive | | 1.0 mole ratio additive | | 1.5 mole ratio additive | |
|---|---|---|---|---|---|---|---|
| Mercaptan | Raw Condensate PPM WT | Contractor Outlet PPM WT | Extractor Outlet PPM WT | Contractor Outlet PPM WT | Extractor Outlet PPM WT | Contractor Outlet PPM WT | Extractor Outlet PPM WT |
| C1-SH | 57.1 | 11.8 | 6.6 | 4.8 | 11.6 | 12.3 | 6.5 |
| C2-SH | 535.9 | 221.1 | 64.9 | 79.9 | 39.7 | 47.7 | 25.0 |
| C3-SH | 369.6 | 383.0 | 162.8 | 197.6 | 63.2 | 77.8 | 37.2 |
| C1-C3 | 962.6 | 616.0 | 234.3 | 282.4 | 114.5 | 137.8 | 68.6 |
| C4-SH | 407.7 | 489.4 | 301.6 | 334.3 | 132.0 | 349.5 | 125.0 |

TABLE 3-continued

Mercaptans removal as a function of additive mole ratio.

| | No additive | 0.5 mole ratio additive | | 1.0 mole ratio additive | | 1.5 mole ratio additive | |
|---|---|---|---|---|---|---|---|
| Mercaptan | Raw Condensate PPM WT | Contractor Outlet PPM WT | Extractor Outlet PPM WT | Contractor Outlet PPM WT | Extractor Outlet PPM WT | Contractor Outlet PPM WT | Extractor Outlet PPM WT |
| C1-C4 | 1370.3 | 1105.4 | 535.9 | 616.7 | 246.5 | 487.4 | 193.7 |
| C5-SH | 845.8 | 1023.6 | 818.0 | 743.8 | 399.0 | 424.8 | 289.5 |
| C6-SH | 627.4 | 755.1 | 745.1 | 521.2 | 379.7 | 398.4 | 387.5 |
| C7-SH | 545.5 | 579.1 | 669.3 | 551.1 | 375.7 | 481.1 | 556.9 |
| C1-C7 | 3389.1 | 3463.2 | 2768.3 | 2432.9 | 1400.8 | 1791.1 | 1427.5 |

Figure 5:
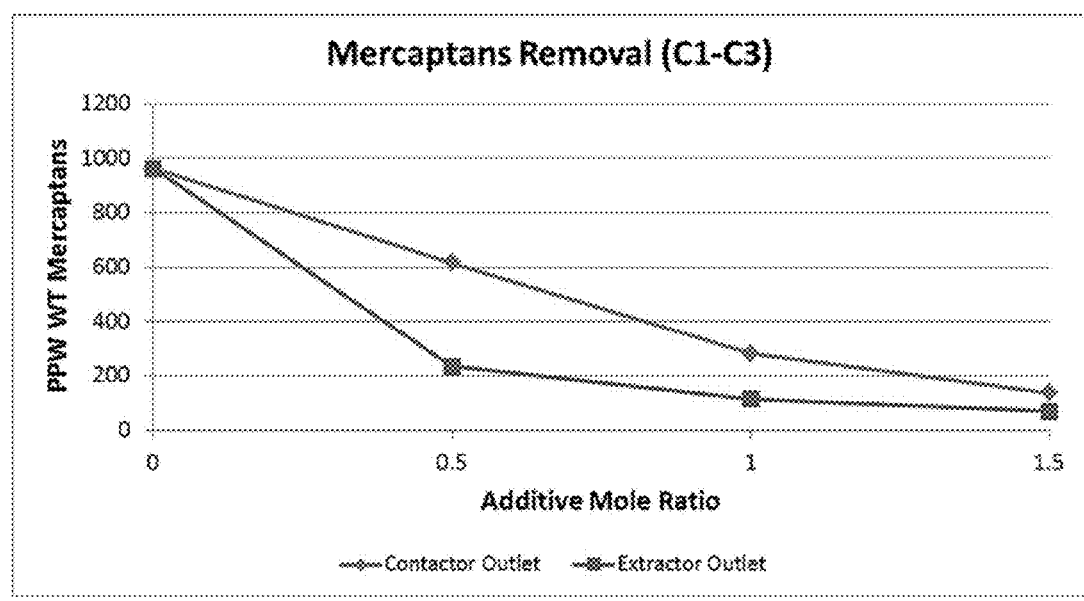
FIG. 5. Removal of C1-C3 mercaptans as a function of additive concentration. Sampling was performed at the outlet of the contactor and extractor.
Figure 6:
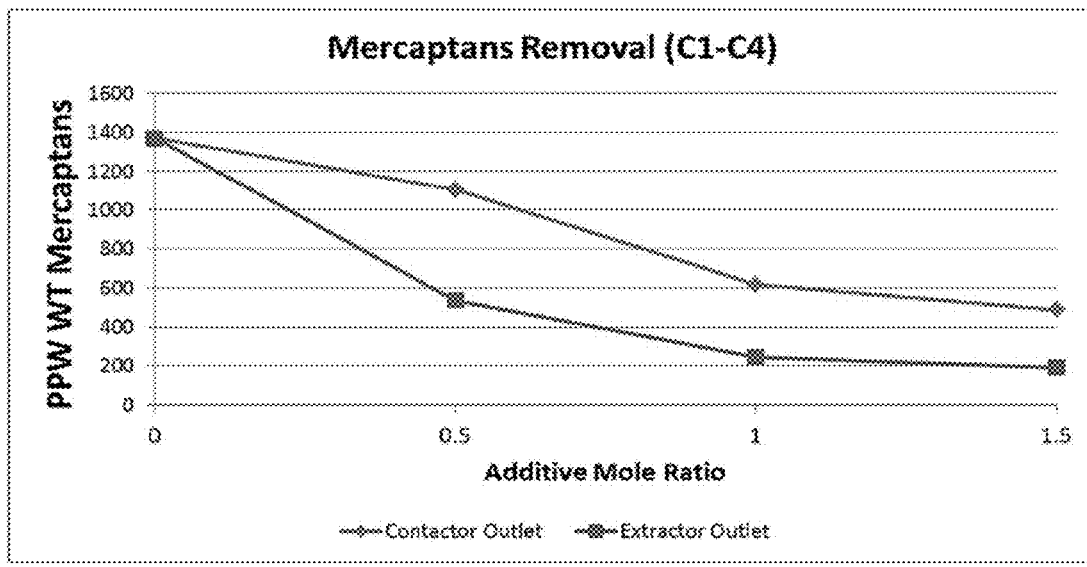
FIG. 6. Removal of C1-C4 mercaptans as a function of additive concentration. Sampling was performed at the outlet of the contactor and extractor.
Figure 7:
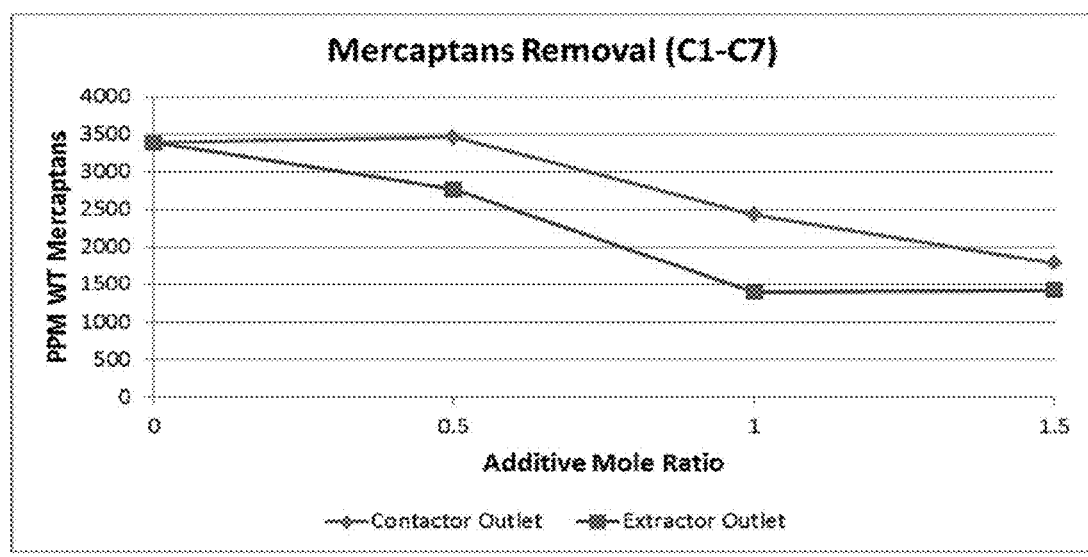
FIG. 7. Removal of C1-C7 mercaptans as a function of additive concentration. Sampling was performed at the outlet of the contactor and extractor.

The measured concentration of C4-C7 mercaptans in the raw condensate was lower than that measured at the contactor outlet at 0.5 mole ratio additive. This can be attributed to one of three possible reasons. One possible reason is that the measurements were made at different times, and a larger amount of mercaptans was present in the raw condensate when the contactor outlet sample was taken. Second, inherent variability in the analytical technique can cause the anomaly. Finally, and least likely, the difference in the concentrations can be due error was made in sampling or analysis. These reason also apply to the lower amounts of C1 mercaptan in the contactor outlet than in the extractor outlet at 1.0 mole ratio, as well as lower amounts of C7 mercaptan in the contactor outlet than in the extractor outlet at 1.5 mole ratio The data for the accumulated mercaptans concentration was also plotted as a function of the additive injection concentration. The plots reflect the concentration at the outlet of the contactor (downstream of the chemical injection point) and at the outlet of the extractor (downstream of the water injection). FIGS. 5-7 show the removal of mercaptans for C1-C3, C1-C4, and C1-C7 as a function of the additive concentration.

Based on the obtained results, it is clearly identified that the additive is significantly reducing the mercaptan levels in the condensate stream. The removal increases as the concentration of additive increases. Increasing the injected amount of additive resulted in increased removal of larger mercaptans after both the contractor and extractor stages. However, beyond 1.0 mole ratio, the benefit of additional additive is however only marginal in terms of mercaptans removal.

It is also interesting to observe that the water wash stage is enabling further mercaptans removal. It is believed that the injected water downstream of the contractor in combination with the extraction stage is enhancing contact surface area and mass transfer, thus enabling additional removal to occur. Thus, in process systems other than Exion, inclusion of a water wash stage will be beneficial.

The test protocol using the miniaturized extractor-separator system allowed indication that a 1.0 mole ratio of OC is sufficient to lower the C1 to C3 mercaptans levels below 200 ppm, and the C1 to C4 mercaptans levels to below 250 ppm. It is also believed that the final additive concentration will be lower if only the C1 to C4 mercaptans are targeted, as the small size mercaptans react faster with the chemical additive. However, the exact amount necessary will depend on the processing system, the targets mercaptans, and additive injection rates.

Effluent Water Testing:

The residual water was also collected and analyzed off-site by Sam Houston State University for common anions and cations using ion chromatography. Table 4 shows the results of such analysis for 1.0 mole ratio additive injections.

TABLE 4

Effluent water analysis from the miniaturized extractor-separator test system for 1.0 mole ratio of additive injections

| Ion | Conc. (mg/L) | Ion | Conc. (mg/L) |
|---|---|---|---|
| Aluminum | 15 | Nitrate | 1.55 |
| Ammonia | 0.05 | Nitrile | >0.06 |
| Calcium | 20.1 | o-Phosphate | 1.41 |
| Chloride | 36,240 | Potassium | 12,200 |
| Fluoride | <0.04 | Sodium | 9,860 |
| Iron | 0.979 | Sulfate | 421.3 |
| Magnesium | 0.251 | Zinc | 0.10 |
| Manganese | 0.066 | pH | 10.2 |

The analyzed water has a high salt content in terms of chlorides and sodium. This is typically found in produced waters from hydrocarbon reservoirs. Also the presence of calcium, magnesium, phosphate and nitrate is indicative of components present of produced water.

The only two components originating from the chemical additive is the sulfate and potassium. These components are generally simple to dispose of however, and they are also present in natural waters. Finally, the presence of iron can be interpreted as from both the naturally occurring water formation as well as by-product from pipeline corrosion.

A series of samples of the raw and treated condensate along with the effluent water as collected in glass vials and pictures were taken for record keeping purposes. Though not shown, the color of the raw condensate was dark brown in color with a slight green tint, as opposed to the treated condensate that was more amber in color, which is attributed to removal of contaminants. Additionally, the water effluent was green in color with some suspended material. After proper phase separation, the upper layer consisted of an amorphous mass of solids with a clearer, pale yellow water layer in the bottom. The solids were attributed to the facility running line cleaning or residual solids in the bottom of the stripper column.

Scale-Up Considerations:

The condensate stream in the process described under Example 1 presented high solids content and fouled the miniaturized extractor-separator system, contactor/extractor more rapidly than anticipated. High solids content was observed intermittently in the effluent wash water and is thought to be caused by line cleaning. In scaling up the mercaptan removal method, larger lines, regular maintenance and/or filters can be used to remove or lessen solids content.

Example 2

The presently described extractor-separator system can also recover amines from a treated liquid hydrocarbon stream. Amine recovery is slightly different from the sulfur-containing species in Example 1 in that a chemical additive is not needed to transform the amines into water-soluble compounds. Furthermore, this example demonstrates the flexibility of the extractor-separator system and its incorporation in an existing process.

In the present example, an existing amine gas treating system was modified to include the extractor-separator system. In an amine gas treatment, alkanolamines (commonly referred to simply as amines) are used to remove hydrogen sulfide ($H_2S$) and carbon dioxide ($CO_2$) from gases, typically liquid petroleum gas (LPG). Considerable amounts of amine carry over are generally present in the treated liquid hydrocarbon streams, thus necessitating its removal. The recovered amines can then be reused in the treatment.

Process Design

A pre-existing liquid petroleum gas (LPG) amine absorber was modified to enhance capacity by more than 50%. However, such modifications resulted in higher amine solvent losses, which led to higher amine replacement cost and contamination of a downstream mercaptan removal unit.

An extractor-separator system according to the present description was inserted between the amine LPG treater and the downstream mercaptan removal unit. Thus, LPG exiting the amine treatment would undergo an additional amine recovery step in the extractor-separator system before the mercaptan removal unit.

LPG Testing

To evaluate the amine recovery capabilities of the extractor-separator, LPG samples were analyzed for amine solvent content after the amine treater but before the extractor-separator and after the extractor-separator but before the mercaptan removal unit.

The LPG treater effluent was initially evaluated for amine loss to establish a baseline measurement for comparison with LPG exiting the extractor-separator. Additionally, copper strip tests were performed on LPG streams exiting the extractor-separator units.

Prior to the start-up of the extractor-separator, significant amine losses were observed from the amine treater and intermittent foaming incidents, indicative of high amine content, were observed in the mercaptans removal units. The LPG stream also failed multiple copper strip tests.

After start-up of the extractor-separator system, total amine recovery increased to nearly 92% with no major problems experienced by the downstream mercaptan removal unit. This equated to nearly 500K in cost savings, caustic protection and passing of copper strip tests. Further savings were realized by avoiding the installation of a new LPG treater column to handle the higher capacity.

The following references are incorporated by reference in their entirety.

U.S. Pat. No. 8,048,175
US20120103872
U.S. Pat. No. 5,446,231
U.S. Pat. No. 4,406,867

The invention claimed is:

1. A method of removing contaminants from a hydrocarbon stream comprising:
   a) supplying a hydrocarbon stream having at least one contaminant;
   b) injecting an additive into said hydrocarbon stream;
   c) mixing said additive and said hydrocarbon stream in a first mixer, then in a contactor vessel to form a hydrocarbon-additive stream, wherein said additive reacts with the contaminants in said hydrocarbon to form water soluble compounds;
   d) injecting water into said hydrocarbon-additive stream;
   e) mixing said water with said hydrocarbon-additive stream in a second mixer to form a water-hydrocarbon-additive stream; and,
   f) separating said water soluble compounds, said additive, and said water from said water-hydrocarbon-additive stream to form a treated hydrocarbon stream.

2. The method of claim 1, wherein said separation occurs in a high efficiency fiber media coalescer.

3. The method of claim 1, wherein said hydrocarbon stream is a liquid or a gas.

* * * * *

UNITED STATES PATENT AND TRADEMARK OFFICE
CERTIFICATE OF CORRECTION

PATENT NO.        : 9,982,201 B2
APPLICATION NO.   : 14/557684
DATED             : May 29, 2018
INVENTOR(S)       : David Birenbaum Engel and Scott Nelson Williams Page 1 of 1

It is certified that error appears in the above-identified patent and that said Letters Patent is hereby corrected as shown below:

In the Specification

Column 5, Line 59 - "hexyls" should be changed to "hexols"
Columns 12 & 13 - Table 3 - "No additive" should be underlined
Columns 12 & 13 - Table 3 - All three instances of "Contractor" should be changed to "Contactor"
Column 13 - Table 3 - "1791.1" should be changed to "1791.7"

Signed and Sealed this
Sixth Day of November, 2018

Andrei Iancu
*Director of the United States Patent and Trademark Office*